United States Patent
Sugimura et al.

(10) Patent No.: US 12,045,881 B2
(45) Date of Patent: *Jul. 23, 2024

(54) INFORMATION AND INTERACTION MANAGEMENT IN A CENTRAL DATABASE SYSTEM

(71) Applicant: ZenPayroll, Inc., San Francisco, CA (US)

(72) Inventors: Peter Sugimura, Diamond Bar, CA (US); Karlotcha Hoa, San Francisco, CA (US); Benjamin Paik, San Francisco, CA (US); Sarah Lippitt, Studio City, CA (US); Mariam Issa, Antioch, CA (US)

(73) Assignee: ZENPAYROLL, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,865

(22) Filed: Sep. 11, 2023

(65) Prior Publication Data

US 2023/0419405 A1    Dec. 28, 2023

Related U.S. Application Data

(63) Continuation of application No. 18/080,102, filed on Dec. 13, 2022, now Pat. No. 11,790,441, which is a
(Continued)

(51) Int. Cl.
*G06Q 40/03* (2023.01)
*G06N 20/00* (2019.01)
*G06Q 40/12* (2023.01)

(52) U.S. Cl.
CPC ............ *G06Q 40/03* (2023.01); *G06N 20/00* (2019.01); *G06Q 40/125* (2013.12)

(58) Field of Classification Search
None
See application file for complete search history.

(56) References Cited

U.S. PATENT DOCUMENTS 10,007,953 B1 * 6/2018 Nathoo ............... G06Q 40/125
10,339,608 B1 * 7/2019 Haitz .................. G06Q 40/125
(Continued)

FOREIGN PATENT DOCUMENTS

CN      113177844 A *  7/2021
CN      113177844 A    7/2021
(Continued)

OTHER PUBLICATIONS

Hua, et al., "A Brief Review of Machine Learning and its Application", 2009, Information Engineering Institute Capital Normal University, entire document pertinent (Year: 2009).*
Wang, H. et al. "A Brief Review of Machine Learning and its Application," *International Conference on Information Engineering and Computer Science*, Dec. 19, 2009, pp. 1-4.
(Continued)

*Primary Examiner* — Paul S Schwarzenberg
(74) *Attorney, Agent, or Firm* — Fenwick & West LLP

(57) ABSTRACT

A central database system allows entities to easily manage human resources functions. An entity requests that the central database system executes an employer function on its behalf, and the central database system determines a probability of the entity defaulting before the entity can finalize the employer function with the central database system. The central database system can train and apply a machine-learned model to dynamically determine the default probability for the entity. Based on the default probability, the central database system determines a risk tolerance associated with the employer function and determines whether to process or challenge the employer function based on the risk tolerance and the default probability.

20 Claims, 3 Drawing Sheets

Related U.S. Application Data continuation of application No. 17/012,050, filed on Sep. 4, 2020, now Pat. No. 11,556,982.

(56) References Cited

U.S. PATENT DOCUMENTS

| | | | |
|---|---|---|---|
| 11,094,020 B1* | 8/2021 | Lee | G06F 16/215 |
| 11,113,650 B2* | 9/2021 | Zaslavsky | G06N 20/00 |
| 2003/0065618 A1* | 4/2003 | VanDeBoe, Jr. | G06Q 20/102 |
| | | | 705/40 |
| 2010/0082469 A1* | 4/2010 | Oliveira | G06Q 40/00 |
| | | | 705/35 |
| 2016/0371661 A1* | 12/2016 | Shah | G06Q 20/3674 |
| 2021/0004915 A1* | 1/2021 | Schrage | G06Q 40/125 |
| 2021/0406346 A1* | 12/2021 | Shiue | G06F 11/3006 |

FOREIGN PATENT DOCUMENTS

| | | | | |
|---|---|---|---|---|
| WO | WO 2017/129076 A1 | 8/2017 | | |
| WO | WO-2017129076 A1 * | 8/2017 | | G06N 20/00 |

OTHER PUBLICATIONS

United States Office Action, U.S. Appl. No. 17/012,050, Oct. 27, 2021, 47 pages.

United States Office Action, U.S. Appl. No. 17/012,050, Apr. 14, 2022, 23 pages.

United States Office Action, U.S. Appl. No. 17/012,050, Jun. 16, 2022, 20 pages.

United States Office Action, U.S. Appl. No. 18/080,102, May 9, 2023, 13 pages.

* cited by examiner

300

```
┌─────────────────────────────────────────────────────────────────┐
│ Access a training data set comprising historical payroll       │
│ transactions executed on behalf of historical entities and     │
│ characteristics of the historical entities                     │
│ 310                                                             │
└─────────────────────────────────────────────────────────────────┘
                                │
                                ▼
┌─────────────────────────────────────────────────────────────────┐
│ Train a machine-learned model based on the accessed training   │
│ data set, the machine-learned model configured to predict a    │
│ probability of default by an entity requesting a payroll       │
│ transaction                                                     │
│ 320                                                             │
└─────────────────────────────────────────────────────────────────┘
                                │
                                ▼
┌─────────────────────────────────────────────────────────────────┐
│ Receiving, via a first interface, a request from a target      │
│ entity to execute a payroll transaction                        │
│ 330                                                             │
└─────────────────────────────────────────────────────────────────┘
                                │
                                ▼
┌─────────────────────────────────────────────────────────────────┐
│ Access information describing characteristics of the target    │
│ entity                                                          │
│ 340                                                             │
└─────────────────────────────────────────────────────────────────┘
                                │
                                ▼
┌─────────────────────────────────────────────────────────────────┐
│ Apply the machine-learned model to the accessed information   │
│ and to characteristics of the requested payroll transaction to │
│ determine a probability of default by the target entity        │
│ 350                                                             │
└─────────────────────────────────────────────────────────────────┘
                                │
                                ▼
┌─────────────────────────────────────────────────────────────────┐
│ Determine an expected loss associated with the requested       │
│ payroll transaction based on the determined probability of     │
│ default                                                         │
│ 360                                                             │
└─────────────────────────────────────────────────────────────────┘
                                │
                                ▼
┌─────────────────────────────────────────────────────────────────┐
│ Challenge, via a second interface, the requested payroll       │
│ transaction in response to the determined expected loss        │
│ exceeding a risk tolerance associated with the target entity   │
│ 370                                                             │
└─────────────────────────────────────────────────────────────────┘
```

FIG. 3

INFORMATION AND INTERACTION MANAGEMENT IN A CENTRAL DATABASE SYSTEM

CROSS REFERENCE TO RELATED APPLICATIONS

This application is a continuation of U.S. application Ser. No. 18/080,102, filed Dec. 13, 2022, now U.S. Pat. No. 11,790,441, which is a continuation of U.S. application Ser. No. 17/012,050, filed Sep. 4, 2020, now U.S. Pat. No. 11,556,982, which is incorporated by reference in its entirety.

BACKGROUND

This disclosure relates generally to central database systems and specifically to the management of information and interactions in human resource central database systems.

Entities often use human resources central database systems to manage human resources functions such as payroll processing. When an entity sends a request to initiate a payroll transaction, a typical human resources central database system provides for the payroll transaction and requests reimbursement from the entity. This ensures that employees of the entity are paid on schedule even if the requested reimbursement is not processed in time for the payroll date. However, there is a risk for the central database system because if the entity is not able to reimburse the central database system, the central database system may not recover the amount of the payroll transaction from the entity.

To mitigate this risk, the central database system may determine a processing limit for the entity and challenge a payroll transaction when the payroll transaction exceeds the processing limit. Typically, the processing limit is determined based on parameters such as a size of the payroll, characteristics of an industry associated with the entity, and an average salary of employees associated with the entity. However, these parameters are not always accurate indicators of a risk associated with the payroll transaction, and the central database system may not detect risky payroll transactions accurately.

The central database system may set a conservative processing limit to reduce a risk of potential loss when an entity fails to reimburse a payroll transaction. Thus, the typical database system may challenge payroll transactions of large entities frequently since large entities maintain large payrolls. It can be inconvenient and time consuming for an entity to frequently submit evidence in response to such challenges despite having the means to process the reimbursements. However, if the central database system requires an entity to wait until after the reimbursement is processed before performing the payroll transaction, employees may be delayed in receiving wages. The central database system may also be unable to accurately detect risk associated with small entities, or with entities that do not have a significant track record with the central database system. Such limitations also expose the central database system to unnecessary risk or delay.

SUMMARY

A human resources central database system determines a risk tolerance and an expected loss associated with a payroll transaction of a target entity to determine whether to challenge the payroll transaction. When the target entity makes a request to execute the payroll transaction, the central database system dynamically determines a probability of default for the target entity at the time of the request. The probability of default may be determined using a machine-learned model trained using a training data set of historical payroll transactions of historical entities executed by the central database system. Each historical payroll transaction in the training data set may be associated with information such as characteristics of the historical entity managed by the central database system, a total payroll amount associated with the historical payroll transaction, whether the historical payroll transaction was completed successfully, a risk tolerance and expected loss associated with the historical payroll transaction, and the like. The central database system applies the machine-learned model to characteristics of the target entity and characteristics of the requested payroll transaction to determine the default probability and calculates the risk tolerance and the expected loss based on the default probability.

By using both characteristics of the target entity that are known to the central database system from the past as well as using characteristics specific to the requested payroll transaction, the central database system can better evaluate a risk associated with the requested payroll transaction. This can improve a user's experience with the central database system by reducing a number of times that stable entities with the capability of completing payrolls unnecessarily receive challenges while simultaneously reducing a risk of failure to identify risky entities for the central database system.

BRIEF DESCRIPTION OF THE DRAWINGS

FIG. 3 is a flowchart illustrating a process for determining risk tolerance for an entity, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
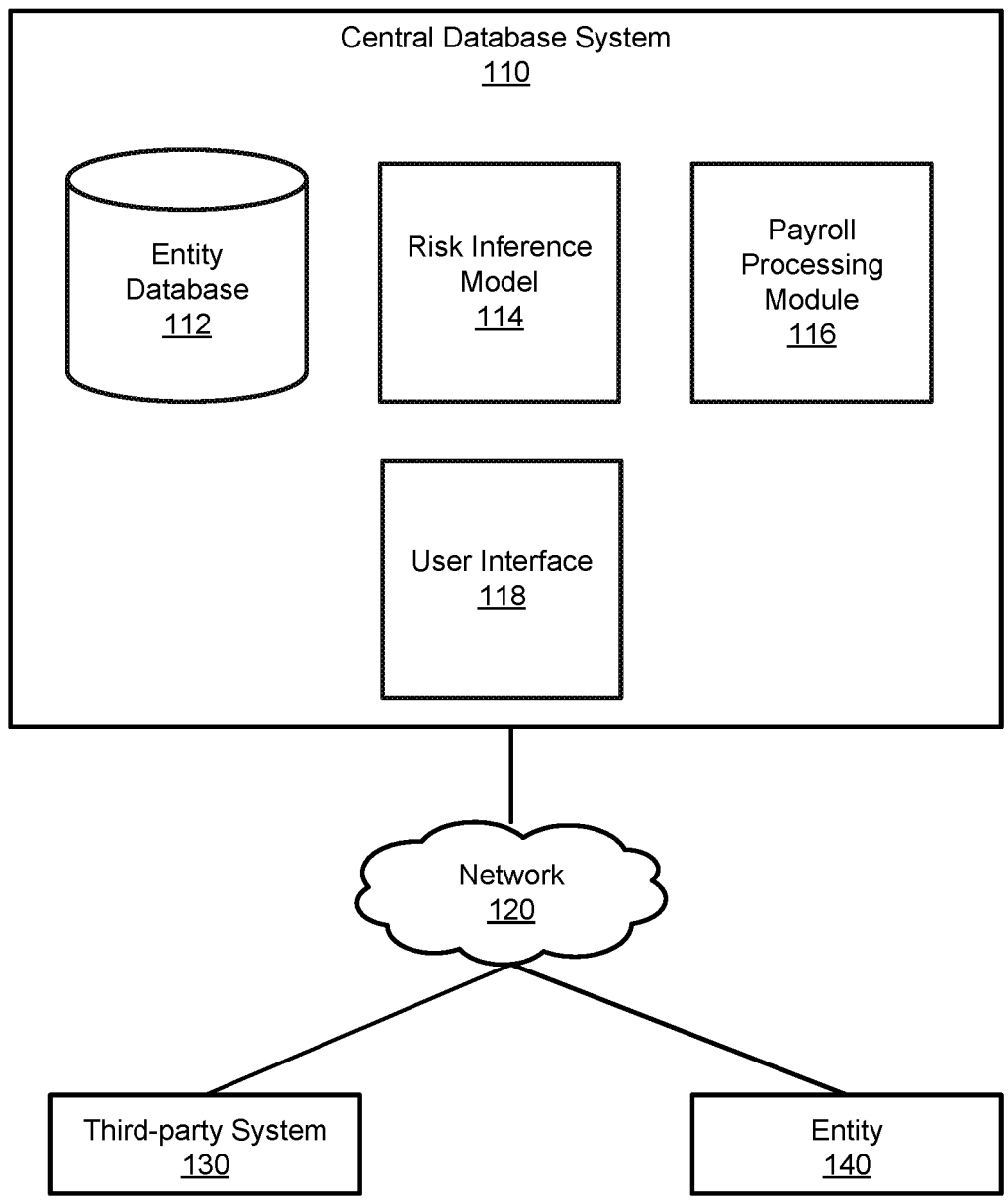
FIG. 1 is a block diagram illustrating a system environment of a central database system, in accordance with an embodiment.

FIG. 1 is a block diagram illustrating a system environment of a central database system, in accordance with an embodiment. The system environment 100 shown in FIG. 1 includes a central database system 110, a network 120, one or more third-party systems 130, and one or more entities 140. The system environment 100 may have alternative configurations than what is illustrated in FIG. 1, including different, fewer, or additional components.

The central database system 110 is configured to process a payroll transaction of an entity 140 when the entity 140 sends a request through the network 120 for the central database system 110 to execute the payroll transaction on behalf of the entity 140. Based on characteristics of the payroll transaction specified by the entity 140 in the request and characteristics of the entity 140 managed by the central database system 110, the central database system 110 dynamically determines a probability of default of the entity 140 at the time of the request. Because parameters of a payroll transaction and characteristics of the entity 140 can vary from one payroll to the next, the central database system 100 determines the probability of default for the entity 140 each time the entity 140 makes a request to initiate payroll. Based on the determined default probability, the central database system 110 determines a risk tolerance for the requested payroll transaction. The risk tolerance represents a maximum amount that the central database system 100 is comfortable with fronting for the entity 140 without requiring evidence from the entity 140 that the entity 140 is unlikely to default. The central database system 100 also determines an expected loss associated with the payroll transaction based on the determined probability of default and compares the expected loss with the risk tolerance to determine whether to challenge the entity 140 before processing the payroll transaction.

The central database system 110 compares the risk tolerance to the expected loss associated with the payroll transaction and determines whether to process the payroll transaction or challenge the requested payroll transaction by requiring evidence from the entity 140 prior to processing the payroll transaction. If the risk tolerance is equal to or exceeds the expected loss, the central database system 110 continues with processing the payroll transaction. On the other hand, if the risk tolerance is lower than the expected loss, the central database system 110 challenges the payroll transaction and requests evidence from the entity 140, such as a screenshot of a current balance of a bank account of the entity 140, documentation detailing financial or other characteristics of the entity 140, or access to an account of an institution or a provider associated with the entity 140 (such as a financial institution and the like).

In the embodiment shown in FIG. 1, the central database system 110 includes an entity database 112, a risk inference model 114, a payroll processing module 116, and a user interface 118. It should be noted that in other embodiments, the central database system 110 can include fewer, additional, or different components than those illustrated herein. In the embodiment of FIG. 1, the central database system 110 is associated with a human resources management entity different from the one or more third-party systems 130 and from the one or more entities 140. Accordingly, the central database system 110 includes hardware (such as servers, networking equipment, databases or other storage devices, data center systems, and the like) distinct (and in some embodiments, physically remotely from) the one or more third-party systems 130 and the one or more entities 140.

The entity database 112 is configured to receive and store information associated with the one or more entities 140 such that the one or more entities 140 may manage payroll, employee benefits, and other human resources functions via the central database system 110. For each enrolled entity 140, the entity database 112 may include an entry within the database that includes attributes of the entity 140 such as number of years in business, time enrolled with the central database system 110, type of industry associated with the entity 140, location of headquarters of the entity, annual revenue, and the like. The entry may also include payroll related information such as number of employees, average gross payroll amount, average employee salary, payroll schedule (e.g., weekly, bi-weekly, monthly), employee taxes, employer taxes, and the like. The entry may also include an entry for each of the employees that includes details such as biographic and demographic information, employee position, benefit (medical, dental, vision, retirement) elections, time sheet information, salary information, bonus information, reimbursement information, and the like. The entity database 112 may also include a payroll transaction history of the entity 140 such as a number and amount of prior payroll transactions, a number of challenged prior payroll transactions, dates of prior payroll transactions, a number of employees on prior payroll transactions, a gross amount or average amount of all prior payroll transactions, a number of successful payroll transactions, a number of failed payroll transactions, prior evidence provided in response to previous payroll challenges, a time since last payroll transaction, a time since last failed payroll transaction, and the like.

The risk inference model 114 is a machine-learned model that is configured to determine a default probability of the entity 140 at a given time. When the entity 140 makes a request to initiate a payroll transaction, the risk inference model 114 is applied to determine a probability of the entity 140 defaulting between a time at which the request is made and a time at which the entity 140 is scheduled to reimburse the central database system 110 for the payroll amount. The risk inference model 114 determines the probability of default based on characteristics of the entity 140 and characteristics of the current payroll transaction associated with the request. The risk inference model 114 may also be applied to information managed by the one or more third-party systems 130 to determine the default probability. Further details on the risk inference model 114 is described below with respect to FIG. 2.

The payroll processing module 116 determines whether to process a payroll transaction or to challenge the payroll transaction based on the probability of default determined by the risk inference model 114. The payroll processing module 116 determines a risk tolerance and an expected loss based on the probability of default determined by the risk inference model 114. The payroll processing module 116 compares the risk tolerance to the expected loss and decides to process the payroll transaction request when the risk tolerance is greater or equal to the expected loss, and decides to challenge the payroll transaction request when the risk tolerance is less than the expected loss.

The user interface engine 118 coordinates communications between the one or more entities 140, the one or more third parties 130, and the central database system 110. The user interface engine 118 can generate one or more graphical user interfaces (GUIs) of the central database system 110 for display by a device of the one or more third parties 130 and the one or more entities 140. These GUIs allow the one or more third parties 130 and the entities 140 to provide information to the central database system 110, to view information stored by the central database system 110, to request a payroll transaction to be processed, and the like. When the central database system 110 challenges a payroll transaction of an entity 140, the user interface engine 118 may generate a GUI in response to determining to challenge the payroll transaction, and the GUI can include interface elements that enable the entity to submit evidence that the entity 140 is unlikely to default, including an API to log in to a third-party system 130 (such as a third-party provider or institution) to provide evidence on the entity's behalf, and the like.

The central database system 110, the one or more third-party systems 130, and the one or more entity devices are configured to communicate via the network 120, which may comprise any combination of local area and/or wide area networks, using wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

The third-party system 130 is a service provider configured to provide additional information associated with an entity 140 to the central database system 110. The central database system 110 may subscribe to or be associated with the third-party system 130. In some embodiments, the third-party system 130 may be an accounting or financial service providers that allow the central database system 110 to access information associated with one or more accounts associated with the entity 140 (such as a bank account balance, a transaction history, and the like). In other embodiments, the third-party system 130 may provide a credit score or other information associated with an entity 140 to the central database system for use in evaluating a risk of default associated with the entity 140.

The entity 140 is a company or an organization that is enrolled with one or more services provided by the central database system 110. The entity 140 communicates with the central database system 110 using devices such as conventional computer systems (such as a desktop or a laptop computer, a server, a cloud computing device, and the like), client devices (such as smartphones, tablet computers, mobile devices, and the like), or any other device having computer functionality to receive user input as well as transmit and/or receive data via the network 120. The entity 140 is configured to communicate with the central database system 110 and/or the third-party system 130 via the network 120, for example suing a native application executed by the devices or through an application programming interface (API) running on a native operating system of the device, such as IOS® or ANDROID™. In another example, the device is configured to communicate with the central database system 110 via an API provided by the central database system 110.

Figure 2:
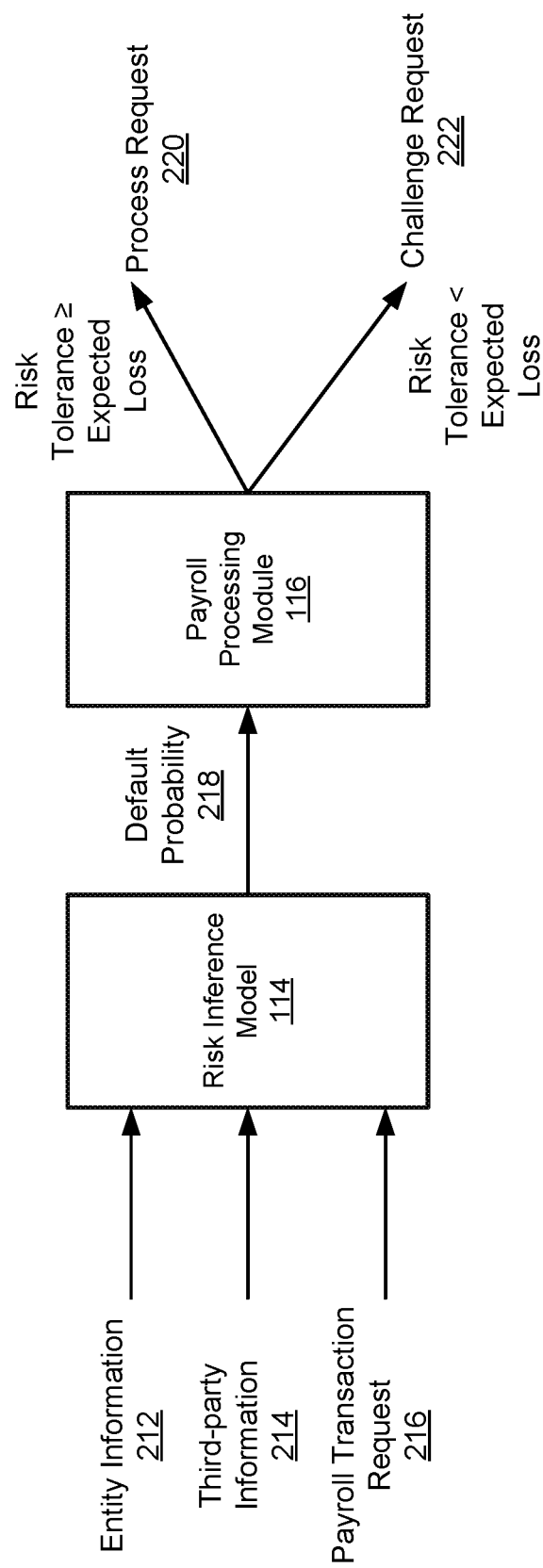
FIG. 2 is a block diagram illustrating an application of a machine-learned model for determining default probability, in accordance with an embodiment.

FIG. 2 is a block diagram illustrating an application of a machine-learned model for determining default probability, in accordance with an embodiment. The risk inference model 114 of the central database system 110 receives entity information 212, third-party information 214, and information associated with a payroll transaction request 216 and determines a default probability 218 of an entity 140 for the payroll transaction. The entity information 212 can include characteristics associated with the entity 140 previously known to the central database system 110 at the time the entity 140 requests the payroll transaction. The entity information 212 can include information stored in the entity database 112 of the central database system 110 discussed above with respect to FIG. 1.

The third-party information 214 includes information managed by one or more third-party systems 130 connected to the central database system 110. The third-party information 214 may include financial information associated with one or more bank accounts of the entity 140, such as a current available balance, a transaction history, an average daily balance, a pay schedule, a credit score, and the like.

The information associated with the payroll transaction request 216 may include information specific to the current payroll such as a percentage of employees receiving pay via a check, a gross pay amount, whether the payroll is off schedule, a number of employees on the payroll, an average pay per employee, a percentage of non-exempt employees on payroll, a net pay amount, an employee tax amount, an employer tax amount, a ratio of employee tax amount to gross pay amount, a ratio of employer tax amount to gross pay amount, a ratio of net pay amount to gross pay amount, a ratio of total tax including employee tax and employer tax and the gross pay amount, and the like.

It should be noted that in some embodiments, the risk inference model 114 determines the default probability 218 based on a subset of the entity information 212, the third-party information 214, and the information associated with the payroll transaction request 216. For instance, the risk inference model 114 may be applied to the entity information 212 and the information associated with the payroll transaction request 216, and may only be applied to the third-party information 214 in response to determining that additional information is needed to evaluate the default probability 218 of an entity 140.

In some embodiments, the risk inference model 114 may determine the default probability 218 based on one or more adjustable parameters that reflect real-time risk tolerance goals of the central database system 110. That is, if the central database system 110 has a higher risk tolerance goal at a given time, the parameters may be adjusted such that the rate of challenging payroll transaction requests is lower. Likewise, if the central database system 100 has a lower risk tolerance goal, the parameter may be adjusted such that the rate of challenging payroll transaction requests is higher. For example, the parameters may include a total loss during a previous period (e.g., during two weeks), and if there was a high loss during the previous period, the parameters may be adjusted to increase the rate of challenging payroll transaction requests. In another example, the parameters may include a capacity of personnel at the central database system 110 to verify challenged payroll transaction requests. If there is a high volume of challenged payroll transaction requests remaining to be verified, the parameters may be adjusted such that the rate of challenging subsequent payroll transaction requests is lower.

The risk inference model 114 is a machine-learned model trained based on a training data set that includes information associated with historical payroll transactions that were previously executed by the central database system 110 by enrolled entities 140. The training data set includes both historical payroll transactions that were processed successfully and historical payroll transactions that resulted in a loss for the central database system 110. Each of the historical payroll transactions is associated with one or more of: characteristics of an associated historical entity 140 from the entity database 112, information associated with the historical entity 140 from third-party systems 130, a total amount of the payroll transaction, whether the payroll transaction was successful, whether the payroll transaction was challenged at the time, a total loss if the payroll transaction failed, and the like.

The risk inference model 114 can include one or more of linear regression models, neural networks, logistic regression, naïve Bayes classifiers, memory-based learning models, random forests, bagged trees, decision trees, boosted trees, any other suitable supervised or unsupervised learning algorithm, or any suitable combination thereof. The risk inference model 114 is trained to identify a correlation between characteristics of an entity 140, characteristics of a requested payroll transaction, and a risk or probability of default by the entity 140. The risk inference model 114 can be retrained using information describing successful and unsuccessful (or defaulted) payroll transactions (for instance, periodically, in response to an entity 140 defaulting on a payroll transaction, or in response to any other suitable criteria).

In some embodiments, the risk inference model 114 may further access a target challenge rate as an input parameter that is specified by the central database system 110. When payroll transaction requests are challenged too often, entities 140 submitting the payroll transaction requests may have unsatisfactory user experiences because submitting evidence that the entities 140 aren't going to default on a payroll transaction can be time-consuming. To improve the user experience for these entities 140, the central database system 110 may set the target challenge rate (e.g., 1 percent of payroll transactions) and may train the risk inference model 114 to modify the weights and parameters of the risk inference model to determine default probabilities 218 such that the resulting rate of challenging payroll transaction requests is equal to or within a threshold of the desired rate. In some embodiments, the target challenge rate may be adjusted based on a volume of challenged payroll transaction during a given period of time. For example, if a challenge rate during a particular week is less than the target challenge rate, but there is a large number of payroll transactions during the week that causes the volume of challenged payroll transactions to be greater than a threshold, the risk inference model 114 may be modified to determine default probabilities 218 to further reduce the challenge rate.

Based on the provided inputs, the risk inference model 114 outputs the default probability 218, which can be a value within a range of 0 and 1. For instance, as the default probability value approaches 1, the more likely it is for the associated entity 140 to default. The payroll processing module 116 receives the default probability 218 and determines whether to process 220 the payroll transaction request or to challenge 222 the payroll transaction request. The payroll processing module 116 may first identify a bin of a plurality of bins that the default probability 218 belongs to. Each bin of the plurality of bins corresponds to a range of different default probability values, and the payroll processing module 116 identifies the bin corresponding to a range of default probability values including the default probability 218. Each bin can be associated with a representative value such as a median or average of default probability values in the bin.

Based on the default probability 218, the payroll processing module 116 determines a risk tolerance and an expected loss associated with the payroll transaction. To determine the risk tolerance, the central database system 110 may select a base risk tolerance that represents a maximum amount of risk that the central database system 110 is willing to take for an entity 140 with the highest possible risk of defaulting. The base risk tolerance can be a fixed value determined by the central database system 110. For example, for an entity 140 that is determined to have a default probability 218 of 1, the central database system 110 may set a maximum risk tolerance of $1,000. However, for an entity 140 with a lower default probability 218, the central database system 110 may be willing to take a greater risk, and the risk tolerance is adjusted based on the default probability 218. In some embodiments, the risk tolerance may be calculated based on a ratio of the default probability 218 and the base risk tolerance such that the risk tolerance increases as the default probability 218 decreases. For example, for another entity 140 that has a default probability of 0.5, the risk tolerance may be determined to be $2,000, twice the risk tolerance for the entity with the default probability of 1.

The central database system 110 determines the expected loss of the payroll transaction based on the default probability 218 and a payroll amount of the payroll transaction. The payroll amount is a gross amount to be paid by the entity 140 for the payroll transaction. The expected loss may be a product of the default probability 218 and the payroll amount. Thus, as the payroll amount or the default probability 218 increases, the expected loss for the central database system 110 also increases.

After determining the risk tolerance and the expected loss for the payroll transaction, the payroll processing module 116 compares the risk tolerance and the expected loss. If the risk tolerance is greater or equal to the expected loss, the payroll processing module 116 continues to process 220 the request without requiring additional evidence from the entity 140. However, if the risk tolerance is less than the expected loss, the payroll processing module 116 challenges 222 the request and requires the entity 140 to provide evidence that the entity 140 is unlikely to default. In some embodiments, the central database system 110 may set a maximum expected loss (e.g., $150,000), and if the expected loss exceeds the maximum expected loss value, the payroll processing module 116 may automatically challenge 222 the request.

In some embodiments, the entity 140 may make a request to initiate a first part of a payroll on one day and make another request to initiate a second part of the payroll on a different day. For example, the payroll may include contractor workers, and the contractor workers may be paid on a different schedule compared to other employees associated with the entity 140. When the risk inference model 114 determines the default probability 218 associated with the entity 140 based on individual parts of the payroll, the risk tolerance may be greater than the expected loss and the parts of the payroll may not be challenged. However, the payroll may be challenged when the first part and the second part of the payroll are considered as a whole. To reduce risk for the central database system 110, when the entity 140 makes multiple payroll transaction requests during a predetermined period (e.g., 1 week), the risk inference model 114 may determine a cumulative default probability 218. For example, when the entity 140 makes a first payroll request during the predetermined period, the risk inference model 114 determines the default probability 218 based on an amount associated with the first payroll request. However, when the entity 140 then makes a second payroll request during the predetermined period, the risk inference model 114 determines the default probability 218 based on a sum of the amount associated with the first payroll request and an amount associated with the second payroll request. Thus, although the first payroll request may not have been challenged, the second payroll request may be challenged.

In some embodiments, the central database system 110 can generate an interface for display to the entity 140 requiring the entity 140 to upload one or more documents indicating a status of the entity (e.g., a financial status, a credit card statement, an account statement, a screenshot of a bank account balance, and the like) that indicates that the entity is not likely to default on reimbursing the payroll transaction. In some embodiments, the central database system 110 can prompt the entity 140 to log in to a third-party interface via an API of the third-party displayed within the interface generated by the central database system 110. In these embodiments, when the entity 140 provides the requested evidence (e.g., either by uploading documents or logging in to a third-party system) to the central database system 110, the central database system 110 may automatically process the payroll transaction request (or a user or manager associated with the central database system 110 may manually process the payroll transaction request) if the provided evidence satisfies the concerns of the central database system 110 (or a user or manager associated with the central database system 110).

In some embodiments, the payroll processing module 116 may override the decision to challenge 222 the request if the payroll transaction request is a first payroll request from an entity 140, an internal payroll request, a payroll request associated with an entity 140 pre-approved by the central database system 110, a payroll request associated with an entity 140 for which the central database system 110 already has account balance information, a wage correction payroll request, an external payroll request, an auto-pilot payroll request, a system processed payroll request, a reversal payroll request, a tax reconciliation payroll request, a disability insurance distribution payroll request, and the like. The payroll processing module 116 may also override the decision to challenge 222 based on previous responses to challenges. For example, if an entity 140 successfully addressed a predetermined number of prior challenges within a period of time (e.g., four prior challenges within a 12 month period), the payroll processing module 116 may override the challenge. However, if the entity 140 then fails a payroll transaction, the number of successful prior challenges maintained by the central database system 110 may be reset to 0.

FIG. 3 is a flowchart illustrating a process for determining a risk tolerance for an entity, in accordance with an embodiment. A central database system accesses 310 a training data set comprising historical payroll transactions executed on behalf of historical entities and characteristics of the historical entities. Based on the accessed training data, the central database system trains 320 a machine-learned model to predict a probability of default by an entity requesting a payroll transaction. When the central database system receives 330 a request from a target entity to execute a payroll transaction via a first interface, the central database system accesses 340 information describing characteristics of the target entity. The central database system applies 350 the machine-learned model to the accessed information and to characteristics of the requested payroll transaction to determine a probability of default by the target entity. Based on the determined probability of default, the central database system determines 360 an expected loss associated with the requested payroll transaction. In response to the determined expected loss exceeding a risk tolerance threshold associated with the target entity, the central database system challenges 370 the requested payroll transaction via a second interface.

The figures depict various example embodiments of the present technology for purposes of illustration only. One skilled in the art will readily recognize from the following description that other alternative embodiments of the structures and methods illustrated herein may be employed without departing from the principles of the technology described herein.

Conclusion

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method to streamline database interactions comprising:

accessing, by a central database system, a training data set comprising historical interactions by historical entities with the central database system and characteristics of the historical entities;

training, by the central database system, a machine-learned model based on the accessed training data set, the machine-learned model configured to determine a rate of requiring a submission of evidence to the central database system from entities associated with interactions with the central database system;

determining, by the central database system, a rate of requiring the submission of evidence to the central database system from target entities by applying the machine-learned model to characteristics of the target entities; and in response to determining that the rate of requiring the submission of evidence to the central database system is too low, retraining, by the central database system, the machine-learned model by adjusting weights and parameters of the machine-learned model such that an updated rate of requiring the submission of evidence to the central database system associated with the retrained machine-learned model is higher than the rate of requiring the submission of evidence to the central database system.

2. The method of claim 1, wherein characteristics of the historical entities include one or more of: past failures associated with each historical entity, an age of an account associated with each historical entity, and a number of years in operation of each historical entity.

3. The method of claim 1, wherein the machine-learned model is further trained based on additional information associated with the historical entities received from one or more third-party systems.

4. The method of claim 1, wherein the evidence is submitted via a second interface generated by the central database system.

5. The method of claim 4, wherein the second interface generated by the central database system comprises one or more of: an upload interface enabling the target entity to upload files and a third-party API interface enabling the target entity to log in to a third-party system that provides the files.

6. The method of claim 1, wherein requiring a submission of evidence to the central database system comprises requesting that a proof of identity or an identity document be provided to the central database system.

7. The method of claim 1, wherein requiring a submission of evidence to the central database system comprises requesting a proof of identity or verification from a third-party system.

8. A non-transitory computer-readable storage medium containing computer program code that, when executed by a processor, causes the processor to perform steps comprising:

accessing, by a central database system, a training data set comprising historical interactions by historical entities with the central database system and characteristics of the historical entities;

training, by the central database system, a machine-learned model based on the accessed training data set, the machine-learned model configured to determine a rate of requiring a submission of evidence to the central database system from entities associated with interactions with the central database system;

determining, by the central database system, a rate of requiring the submission of evidence to the central database system from target entities by applying the machine-learned model to characteristics of the target entities; and in response to determining that the rate of requiring the submission of evidence to the central database system is too low, retraining, by the central database system, the machine-learned model by adjusting weights and parameters of the machine-learned model such that an updated rate of requiring the submission of evidence to the central database system associated with the retrained machine-learned model is higher than the rate of requiring the submission of evidence to the central database system.

9. The non-transitory computer-readable storage medium of claim 8, wherein characteristics of the historical entities include one or more of: past failures associated with each historical entity, an age of an account associated with each historical entity, and a number of years in operation of each historical entity.

10. The non-transitory computer-readable storage medium of claim 8, wherein the machine-learned model is further trained based on additional information associated with the historical entities received from one or more third-party systems.

11. The non-transitory computer-readable storage medium of claim 8, wherein the evidence is submitted via a second interface generated by the central database system.

12. The non-transitory computer-readable storage medium of claim 11, wherein the second interface generated by the central database system comprises one or more of: an upload interface enabling the target entity to upload files and a third-party API interface enabling the target entity to log in to a third-party system that provides the files.

13. The non-transitory computer-readable storage medium of claim 8, wherein requiring a submission of evidence to the central database system comprises requesting that a proof of identity or an identity document be provided to the central database system.

14. The non-transitory computer-readable storage medium of claim 8, wherein requiring a submission of evidence to the central database system comprises requesting a proof of identity or verification from a third-party system.

15. A system comprising:

a hardware processor; and a non-transitory computer-readable medium containing instructions that, when executed by the hardware processor, cause the hardware processor to:

accessing, by a central database system, a training data set comprising historical interactions by historical entities with the central database system and characteristics of the historical entities;

training, by the central database system, a machine-learned model based on the accessed training data set, the machine-learned model configured to determine a rate of requiring a submission of evidence to the central database system from entities associated with interactions with the central database system;

determining, by the central database system, a rate of requiring the submission of evidence to the central database system from target entities by applying the machine-learned model to characteristics of the target entities; and in response to determining that the rate of requiring the submission of evidence to the central database system is too low, retraining, by the central database system, the machine-learned model by adjusting weights and parameters of the machine-learned model such that an updated rate of requiring the submission of evidence to the central database system associated with the retrained machine-learned model is higher than the rate of requiring the submission of evidence to the central database system.

16. The system of claim 15, wherein characteristics of the historical entities include one or more of: past failures associated with each historical entity, an age of an account associated with each historical entity, and a number of years in operation of each historical entity.

17. The system of claim 15, wherein the machine-learned model is further trained based on additional information associated with the historical entities received from one or more third-party systems.

18. The system of claim 15, wherein the evidence is submitted via a second interface generated by the central database system.

19. The system of claim 18, wherein the second interface generated by the central database system comprises one or more of: an upload interface enabling the target entity to upload files and a third-party API interface enabling the target entity to log in to a third-party system that provides the files.

20. The system of claim 15, wherein requiring a submission of evidence to the central database system comprises requesting that a proof of identity or an identity document be provided to the central database system.

* * * * *